United States Patent

Lockwood

[15] 3,651,492

[45] Mar. 21, 1972

[54] NONVOLATILE MEMORY CELL

[72] Inventor: George C. Lockwood, Kettering, Ohio

[73] Assignee: The National Cash Register Company, Dayton, Ohio

[22] Filed: Nov. 2, 1970

[21] Appl. No.: 86,191

[52] U.S. Cl. ......................340/173 R, 340/173 FF, 307/238, 307/279

[51] Int. Cl. ......................................G11c 11/40, G11c 5/02

[58] Field of Search .................340/173 R, 173 FF; 307/238, 307/279

[56] References Cited

UNITED STATES PATENTS

| | | | |
|---|---|---|---|
| 3,530,443 | 9/1970 | Crafts et al | 340/173 R |
| 3,508,211 | 4/1970 | Wegener | 340/173 R |
| 3,549,911 | 12/1970 | Scott, Jr. | 307/279 |
| 3,579,204 | 5/1971 | Lincoln | 340/173 R |

*Primary Examiner*—Stanley M. Urynowicz, Jr.
*Attorney*—Louis A. Kline, John J. Callahan and John P. Tarlano

[57] ABSTRACT

The present invention relates to a nonvolatile memory cell comprising two nonvolatile alterable threshold voltage field effect transistors. The drain electrodes of the two nonvolatile alterable threshold voltage field effect transistors are coupled through load transistors to a common negative power supply. Their gates are connected together and to an external source of negative pulses. Their sources are connected to circuits sensitive to current in the two alterable transistors. The first nonvolatile alterable threshold voltage field effect transistor is placed at a first threshold voltage, and the second alterable threshold voltage field effect transistor is placed at a second threshold voltage. The different threshold voltages set the nonvolatile memory cell in a one state or in a zero state. A current will first pass through the alterable threshold voltage field effect transistor having the less negative threshold voltage, before it passes through the alterable threshold field effect transistor having the more negative threshold voltage during the application of a negatively increasing gate voltage to both alterable threshold voltage field effect transistors. The state of the nonvolatile memory cell is thus determined by which nonvolatile alterable threshold voltage transistor conducts first.

11 Claims, 3 Drawing Figures

INVENTOR
GEORGE C. LOCKWOOD

BY Louis A. Kline
John J. Callahan
John P. Tarlano
HIS ATTORNEYS

INVENTOR
GEORGE C. LOCKWOOD
BY Louis A. Kline
John J. Callahan
John P. Tarlano
HIS ATTORNEYS

INVENTOR
GEORGE C. LOCKWOOD
BY
HIS ATTORNEYS

NONVOLATILE MEMORY CELL

BACKGROUND OF THE INVENTION

Gordon G. Rabanus, in NAECON RECORD 1970, pages 243 to 246, has disclosed a nonvolatile memory cell comprising a single alterable threshold voltage MNOS field effect transistor. A negative charge can be stored at its silicon nitride-silicon oxide interface to negatively decrease its threshold voltage. A reference gate voltage is applied to the gate electrode of the memory cell. If the reference gate voltage of that cell is more negative than the threshold voltage due to charge storage therein, the nonvolatile memory cell turns on. If the reference gate voltage is less negative than the threshold voltage due to no charge storage therein, the nonvolatile memory cell remains off. A difficulty with using only one electrically alterable field effect transistor per nonvolatile memory cell comes about due to the loss of charge storage within a charged alterable field effect transistor with time, which therefore affects the readout of stored information therefrom. The threshold voltage of a nonvolatile alterable field effect transistor will decrease with time due to loss of stored charge therefrom. The transistor may, after a month's storage time, not conduct at a reference gate voltage, when it should conduct. This is due to the loss of charge which is stored at its silicon nitride-silicon oxide interface. Such a memory cell is therefore unreliable.

The nonvolatile memory cell of the present invention compares the beginning of conduction of two alterable threshold voltage field effect transistors against one another, rather than the beginning of conduction of one such transistor against a reference gate voltage. Information in the nonvolatile memory cell of the present invention is written by decreasing the threshold voltage of one alterable threshold field effect transistor with respect to the other, rather than changing the threshold voltage of a single nonvolatile variable threshold field effect transistor with respect to a reference gate voltage. The threshold voltage of the charged transistor of the memory cell of the present invention will decrease with time. However, the relativeness of the threshold voltages between the two transistors will not change with time. Therefore the relative difference between the threshold voltages of the two nonvolatile transistors may e used to determine the state of the nonvolatile memory cell of the present invention.

The nonvolatile memory cell is alterable, since the relative difference in the threshold voltages of the alterable threshold voltage transistors in the nonvolatile memory cell may be changed electrically. The nonvolatile memory cell is nonvolatile in view of the fact that, if power is removed from the nonvolatile memory cell, the relativeness in the threshold voltages of the two nonvolatile alterable threshold voltage field effect transistors therein remains unchanged. Therefore information in the nonvolatile memory cell of the present invention will continue for over a year without power being applied thereto.

SUMMARY OF THE INVENTION

A nonvolatile memory cell for the storage of a binary bit of information therein, comprising a first nonvolatile storage means for nonvolatilly storing an electrical charge therein, and a second nonvolatile storage means in association with the first storage means for nonvolatilly storing an electrical charge therein, the amount of the one electrical charge being greater or less than the amount of the other electrical charge to cause one nonvolatile storage means to conduct before the other under the action of a common changing read voltage thereto.

An object of the present invention is to provide a nonvolatile memory cell.

Another object of the present invention is to provide circuit means to read or write information into or out of the nonvolatile memory cell.

DESCRIPTION OF THE PREFERRED EMBODIMENT

Figure 1:
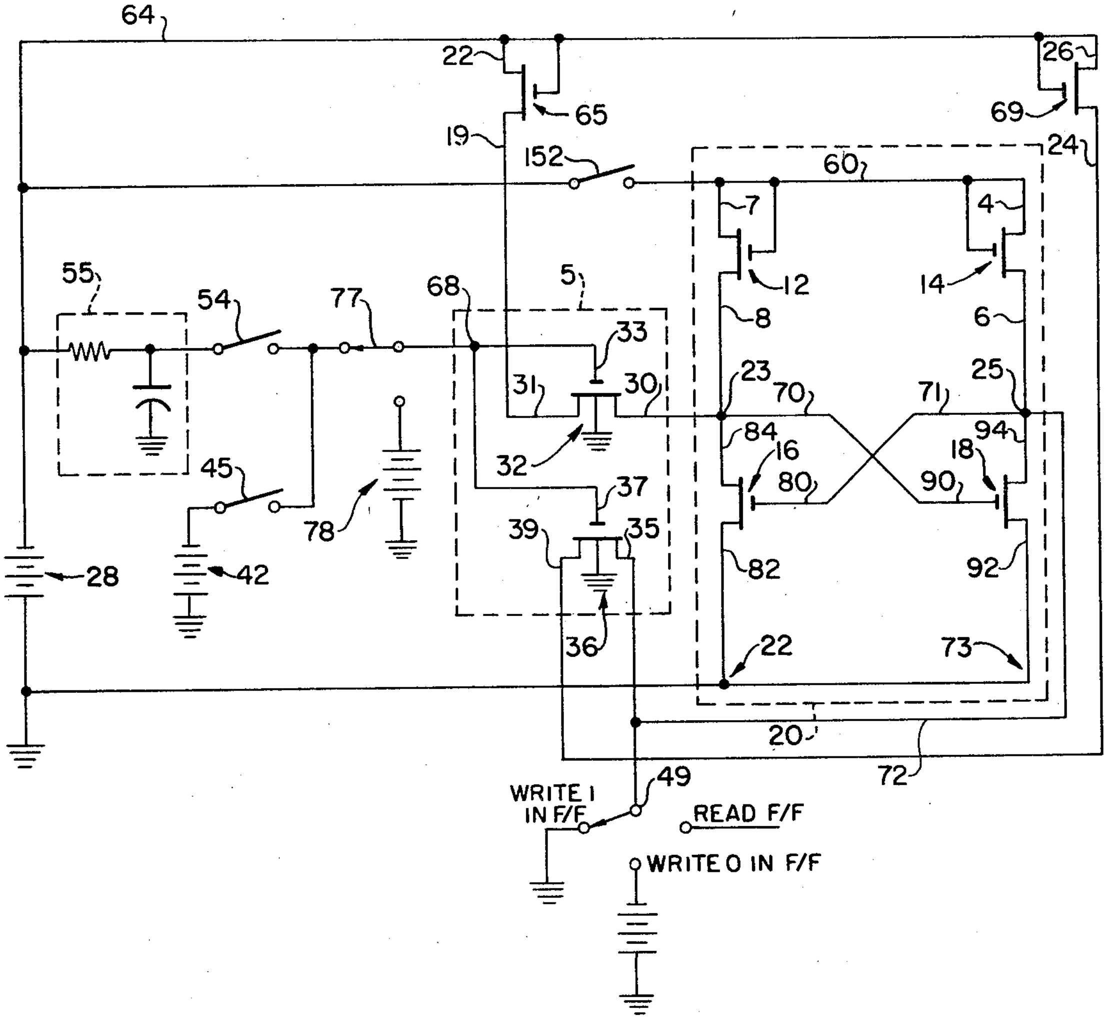
FIG. 1 is a schematic diagram of a nonvolatile memory cell of the present invention.

FIG. 1 shows the nonvolatile memory cell 5 of the present invention. As shown in FIG. 1, the drain electrode 31 of a nonvolatile alterable threshold voltage transistor 32, such as a P-channel metal-silicon nitride-silicon dioxide-silicon MNOS transistor, is connected to the source electrode 19 of a metal-silicon oxide-silicon (MOS) transistor 65. Similarly, the drain electrode 39 of another nonvolatile alterable threshold voltage transistor 36, such as a P-channel MNOS transistor, is connected to the drain electrode 24 of an MOS transistor 69. The drain electrodes 22 and 26 and the gate electrodes of the MOS transistors 65 and 69 are connected to a −24-volt power supply 28 via a line 64. The source electrodes 30 and 35 of the MNOS transistors 32 and 36 are connected to a read-in, readout device, such as to the terminals 23 and 25 of the flip-flop circuit 20. The flip-flop circuit 20 is said to have a left half 22 and a right half 73. The gate electrodes 33 and 37 of the nonvolatile alterable threshold voltage MNOS transistors 32 and 36 are connected to a negatively increasing gate voltage circuit 55 through a switch 54. An increasingly negative gate voltage is applied from the negative gate voltage circuit 55 to turn on the MNOS transistor 32, which has the less negative threshold voltage than the MNOS transistor 36, before the MNOS transistor 36. The drain electrodes 7 and 4 and the gate electrodes of the MOS load transistors 12 and 14 of the flip-flop circuit 20 are connected to the power supply 28 via a line 60. The source electrodes 8 and 6 are connected to the terminals 23 and 25, respectively.

In the present embodiment, the threshold voltage of the MNOS transistor 32 is minus 2 volts, and the threshold voltage of the MNOS transistor 36 is minus 6 volts. Since (−2 volts) (−6 volts) = + 4 volts, the nonvolatile memory cell 5 is in a one state. That is, the sign of the difference in threshold voltages between MNOS transistors 32 and 36 is positive. MNOS transistor 32 will conduct electrons from the drain electrode 31 to the source electrode 30 when minus 2 volts is applied between its gate electrode 33 and its source electrode 30, due to the fact that many electrons are stored at its silicon nitride-silicon oxide insulator layer interface. The MNOS transistor 36 will not conduct electrons from the drain electrode 39 to the source electrode 35 until minus 6 volts is applied between its gate electrode 37 and its source electrode 35 due to the fact that few electrons are stored at its silicon nitride-silicon oxide insulator layer interface. The substrate of the MNOS transistors 32 and 36 are grounded. The electrons held within the MNOS transistor 32 affect the silicon semiconductor material thereunder to aid in the formation of a P-channel region in the silicon semiconductor material between its P-type source and drain regions.

The MNOS transistors 32 and 36 each have an approximately 30-Angstrom-thick silicon oxide layer and a 1,000-Angstrom-thick silicon nitride layer, so that negative charge may alternately be drawn to its silicon dioxide-silicon nitride interface from the lower N-type silicon substrate. This is the embodiment of the present MNOS transistors 32 and 36. The negative charge at the silicon dioxide-silicon nitride interface then acts to negatively decrease the threshold voltage of whichever MNOS transistor has charge stored therein. The method of fabricating the MNOS transistors 32 and 36 is disclosed in U.S. patent application Ser. No. 869,699, filed Oct. 27, 1969, by Charles T. Naber, entitled "Method of Oxidizing a Silicon Wafer," and assigned to the present assignee.

The MNOS transistors 32 and 36 each could be built with a thin approximately 30-Angstrom-thick silicon nitride layer and a 1,000-Angstrom-thick silicon oxide layer. The negative charge then tunnels through the thin silicon nitride layer to the silicon nitride-silicon oxide interface from the gate electrode above the thin silicon nitride layer. The negative charge at the silicon nitride-silicon oxide interface would act to negatively decrease the threshold voltage of whichever MNOS transistor has the charge stored therein.

In place of the nonvolatile variable threshold MNOS transistors 32 and 36, MAOS transistors could be used. A nonvolatile variable threshold MAOS transistor has a metal gate electrode, a thick aluminum oxide insulator layer, a thin silicon oxide insulator layer, and a silicon substrate. The charge is stored at the interface between the aluminum oxide and the silicon oxide to negatively decrease the threshold of the nonvolatile MAOS transistor. Other insulator materials could alternatively be substituted for aluminum oxide to form nonvolatile variable threshold field effect transistors.

Figure 2:
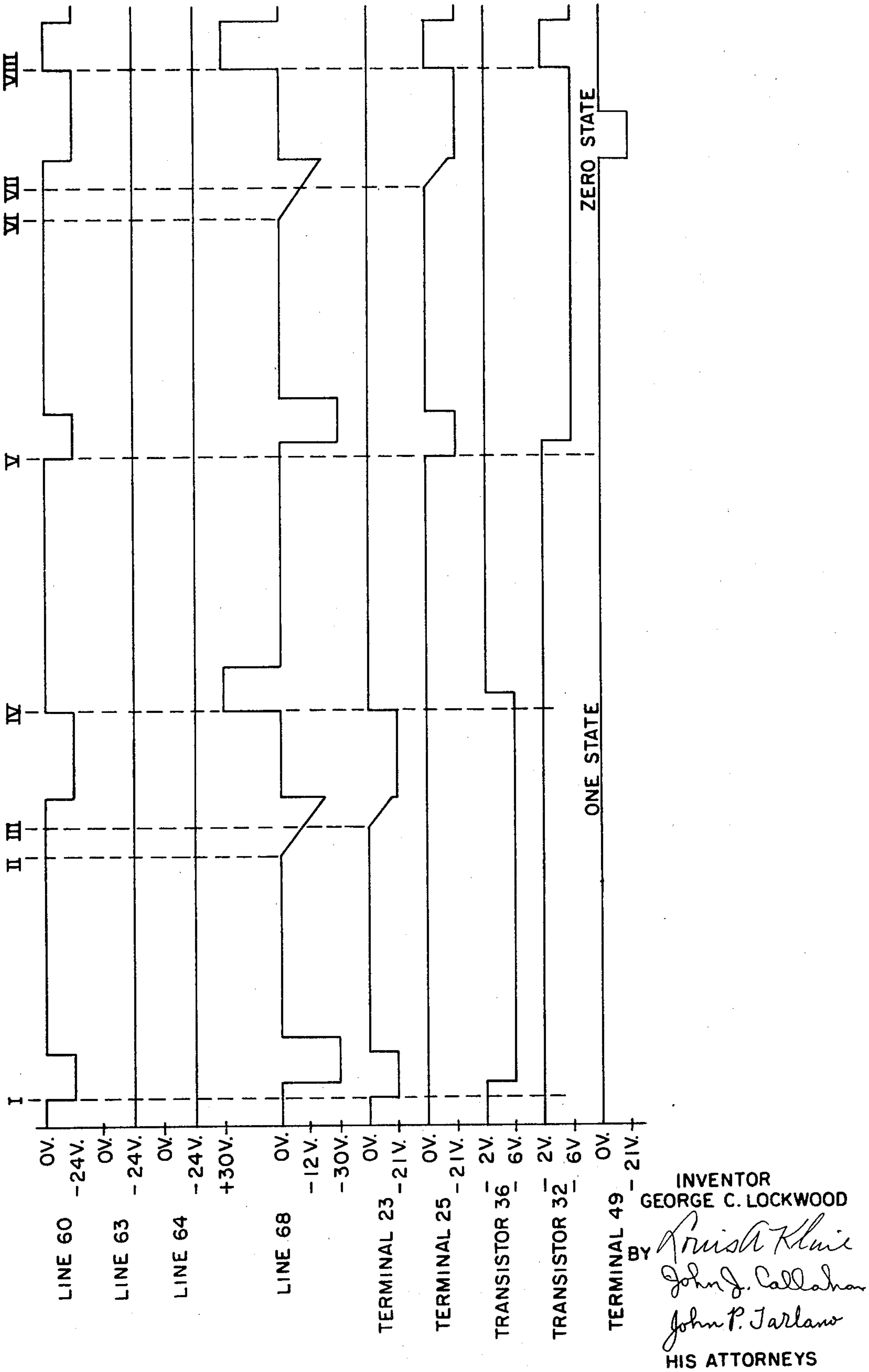
FIG. 2 is a timing diagram for the nonvolatile memory cell of FIG. 1.

The timing diagram of the alterable threshold voltage field effect transistors of the nonvolatile memory cell 5 of FIG. 1 is shown in FIG. 2. At time II of FIG. 2, the voltage on the line 68 of FIG. 1 begins to go negative at the rate of 24 volts per microsecond. The voltage on the gate electrode 33 of the MNOS transistor 32 reaches minus 2 volts at time III. The transistor 32 begins to conduct, thereby placing a minus voltage on the source electrode 30 of the MNOS transistor 32, due to the fact that negative electrical charge is stored therein. The MNOS transistor 36 does not begin to conduct until the voltage on the line 68 reaches minus 6 volts, since little negative electrical charge is stored at its silicon nitride-silicon oxide insulator layer interface. The source electrode 35 will not, however, go negative when the voltage on the gate electrode 37 of the MNOS transistor 36 reaches minus 6 volts at time III, since the terminal 25 of the flip-flop circuit 20 is set and held at ground potential, and the MOS transistor 18 turns on via the line 70 when the MNOS transistor 32 begins to conduct. The terminal 23 of the flip-flop circuit 20 is driven to minus 4 volts by the MNOS transistor 32. The source electrode 92 and the drain electrode 94 of the MOS transistor 18 are at ground potential. Its gate electrode 90 is at minus 4 volts potential.

At time II, a minus 2 volts was placed on the gate electrode 33. The MNOS transistor 32 conducted electrons from its drain electrode 31 to the terminal 23 of the flip-flop circuit 20. The flip-flop circuit 20 is set to what is called a "1" state when its terminal 23 reaches a negative voltage before the terminal 25. The terminal 23 reaches a negative voltage before the terminal 25, since the MNOS transistor 32 turns on before the MNOS transistor 36. The flip-flop circuit 20 is further set to the "1" state by now applying minus 24 volts to the line 60 via a switch 152. Therefore, a "1" bit in the MNOS read-only memory cell 5 is shifted to the flip-flop circuit 20 during readout of the nonvolatile memory cell 5. The "1" bit in the flip-flop circuit 20 may be passed into a computer through the terminal 49 via the line 72 of FIG. 1. The flip-flop circuit 20 is a sensitive intermediate read-in, readout device for the nonvolatile memory cell 5. However, other read-in, readout devices, such as external comparator type integrated circuits, may be used in place of the flip-flop circuit 20.

The information in the nonvolatile memory cell 5, which cell 5 is made up of the alterable threshold nonvolatile MNOS transistors 32 and 36, is read out by means of the intermediate flip-flop circuit 20. The flip-flop circuit 20 is used to sense the information in the nonvolatile memory cell 5, even though the difference in the threshold voltages of the MNOS transistors 32 and 36 may change to within a few tenths of a volt from one another due to loss of charge from the interface of one MNOS transistor. The nonvolatile memory cell 5 has an increased readable memory life of over a year. Therefore it is considered to be nonvolatile. This memory life is extended by the sensitive read circuit of FIG. 1, which reads the difference in the threshold voltages of the two MNOS transistors 32 and 36, rather than their absolute values. The nonvolatile memory cell 5 will thus store a binary bit of information without external power thereto for over 1 year.

The threshold voltage of the MNOS transistor 36 is now made less negative (−2 volts) than the threshold voltage of the MNOS transistor 32 (−6 volts) at time V. The nonvolatile memory cell 5 of FIG. 1 is then said to be in a 0 state as read out just before time VIII. The flip-flop circuit 20 is used to set the nonvolatile memory cell 5 to a zero state at time V and is used to read out that 0 state at time VII. Since (−6 volts) − (−2 volts) = −4 volts, the nonvolatile memory cell 5 is in the zero state. That is, the sign of the difference in threshold voltages between the MNOS transistors 32 and 36 is negative. The MNOS transistor 36 will conduct before the MNOS transistor 32. The MNOS transistor 36 is now charged, while the MNOS transistor 32 is now uncharged.

The nonvolatile memory cell 5 of FIG. 1 is used as an electrically alterable nonvolatile read-only memory. It is only necessary to set the nonvolatile MNOS transistors 32 and 36 to respectively different threshold voltages to set the nonvolatile memory cell 5 to a one or zero binary state. The state of the nonvolatile memory cell 5 of FIG. 1 under dynamic conditions is then determined.

FIG. 2 shows the voltage on the gates 33 and 37 via the line 68 after time V. At time VI, the voltage on the gates 33 and 37 begins to negatively increase at the rate of 24 volts per microsecond. At time VII, the MNOS transistor 36 turns on before the MNOS transistor 32. The source electrode 35 of the MNOS transistor 36 goes negative at time VII. The gate electrode 80 of the MOS transistor 16 is placed at −4 volts. The MOS transistor 16 of the flip-flop circuit 20 is therefore turned on via the line 71 at time VII. Since the MOS transistor 16 is on and its source electrode 82 is at ground potential, its drain electrode 84 is placed at ground potential at time VII. The terminal 23 is therefore placed at ground potential at time VII. Since the gate electrode 90 of the MOS transistor 18 is connected to the terminal 23, the gate electrode 90 is held at ground potential via the line 70 at time VII. The MOS transistor 18 is therefore held off at time VII. The flip-flop circuit 20 is thus in a zero state. The MNOS transistor 32 will then turn on. However, the read-in, readout flip-flop circuit 20 has already been set to a 0 state and is not affected. The flip-flop circuit 20 therefore remains in the "0" state and is unaffected by the subsequent coming on of the MNOS transistor 32 after the MNOS transistor 36 just before time VIII.

The operation of the flip-flop circuit 20 is such that, if the MNOS transistor 36 comes on before the MNOS transistor 32, the flip-flop circuit 20 is placed in a zero state. The flip-flop circuit 20 remains in a zero state even though the transistor 32 then comes on. Alternatively, if the transistor 32 comes on before the transistor 36, the flip-flop circuit 20 is set to a "1" state. The flip-flop circuit 20 remains in the "1" state even though the MNOS transistor 36 then comes on.

FIG. 1 also shows P-channel MOS load transistors 65 and 69. These load transistors 65 and 69, along with the flip-flop circuit 20, are used for the writing of the memory cell 5 just after times I and V at FIG. 2. As seen in FIG. 1, the source electrode 19 of the MOS transistor 65 is connected to the drain electrode 31 of the MNOS transistor 32. The source electrode 24 of the MOS transistor 69 is connected to the drain electrode 39 of the MNOS transistor 36. The drain electrodes 22 and 26 of the MOS transistors 65 and 69 are connected to the line 64, which is at −24 volts. At time I, the flip-flop circuit 20 is placed in a "1" state by grounding the terminal 49 and closing the switch 152. The source electrode 24 of the MOS transistor 69 and the drain electrode 39 of the MNOS transistor 36 are then at −2.5 volts. The terminal 25 is at zero volts, and the terminal 23 is placed at −24 volts by closing the switch 152. The flip-flop circuit 20 is in a "1" state and is used to write the read-only memory cell 5 to a "1" state just after time I of FIG. 2. The flip-flop circuit 20 is in the "1" state at time I to write the memory cell 5. The read-only memory cell 5 is then written to a "1" state by placing the gate electrodes 33 and 37 of the MNOS transistors 32 and 36 to −30 volts with the battery 42 just after time I by closing the switch 45. The switch 45 is then opened after 1 millisecond.

The terminal 49 and therefore the terminal 25 are alternately placed at −24 volts to set the flip-flop circuit 20 to a zero state at time V. The switch 152 is closed. The source electrode 19 of the MOS transistor 65 and the drain electrode 31 of the MNOS transistor 32 rise to −2.5 volts. Placing −30 volts on the line 68 with the switch 45 just after time V then sets the memory cell 5 to a zero state. The flip-flop circuit 20 is placed in a zero state at time V to write the memory cell 5 to a zero state just after time V.

The nonvolatile memory cell 5 of FIG. 1, which is in a "1" state at time III, may be erased at time IV by placing a plus 30 volts from the battery 78 on the gate electrodes 33 and 37 of the MNOS transistors 32 and 36 with the switch 77. The substrates of both MNOS transistors 32 and 36 are grounded. Electrons within the silicon substrate underneath the silicon nitride layer of the MNOS transistor 36 are drawn at time IV to the silicon nitride-silicon oxide interface. The threshold voltage of the MNOS transistor 36 changes from −6 volts back to −2 volts at time IV. The threshold voltage of the MNOS transistor 32 remains at −2 volts at time IV, since its silicon nitride-silicon oxide insulator layer interface already has many excess electrons therein. The silicon nitride-silicon oxide insulator layer interfaces of both MNOS transistors 32 and 36 therefore are negatively charged at time IV, to erase the one bit in the memory cell 5.

The MOS transistors 65 and 69 have an internal resistance of 100,000 ohms, whereas the MNOS transistors 32 and 36 have an internal resistance of 5,000 ohms. Therefore the drain electrode 31 or 39 of the MNOS transistor 32 or 36 is very near ground when it is conducting and its source electrode 30 or 35 is at ground. This thus allows almost a 30-volt difference between the gate electrode 37 and the source and drain electrodes 35 and 39 of the MNOS transistor 36 just after time I. The MNOS transistor 36 has its threshold voltage made more negative just after time I, since its source electrode 35 is placed at ground at time I.

When the source electrode 30 of the MNOS transistor 32 is held at zero volts at time V and the gate electrode 33 is placed at −30 volts, just after time V, a current flows from the MNOS transistor 32 through the load transistor 65. The drain electrode 31 of the MNOS transistor 32 is placed at −2.5 volts at this time, since the drain electrode 22 of the MOS transistor 65 is held at −24 volts. Electrons are repelled out of the silicon nitride-silicon oxide interface of the MNOS transistor 32 just after time V to change its threshold voltage from −2 volts to −6 volts. Then, during reading, at time VI, an increasingly negative variable gate voltage is being placed on the connected gate electrodes 33 and 37 via the line 68, and the MNOS transistor 36 will then turn on at −2 volts, but the MNOS transistor 32 will not turn on until its gate electrode reaches −6 volts with respect to its source electrode 30.

Figure 3:
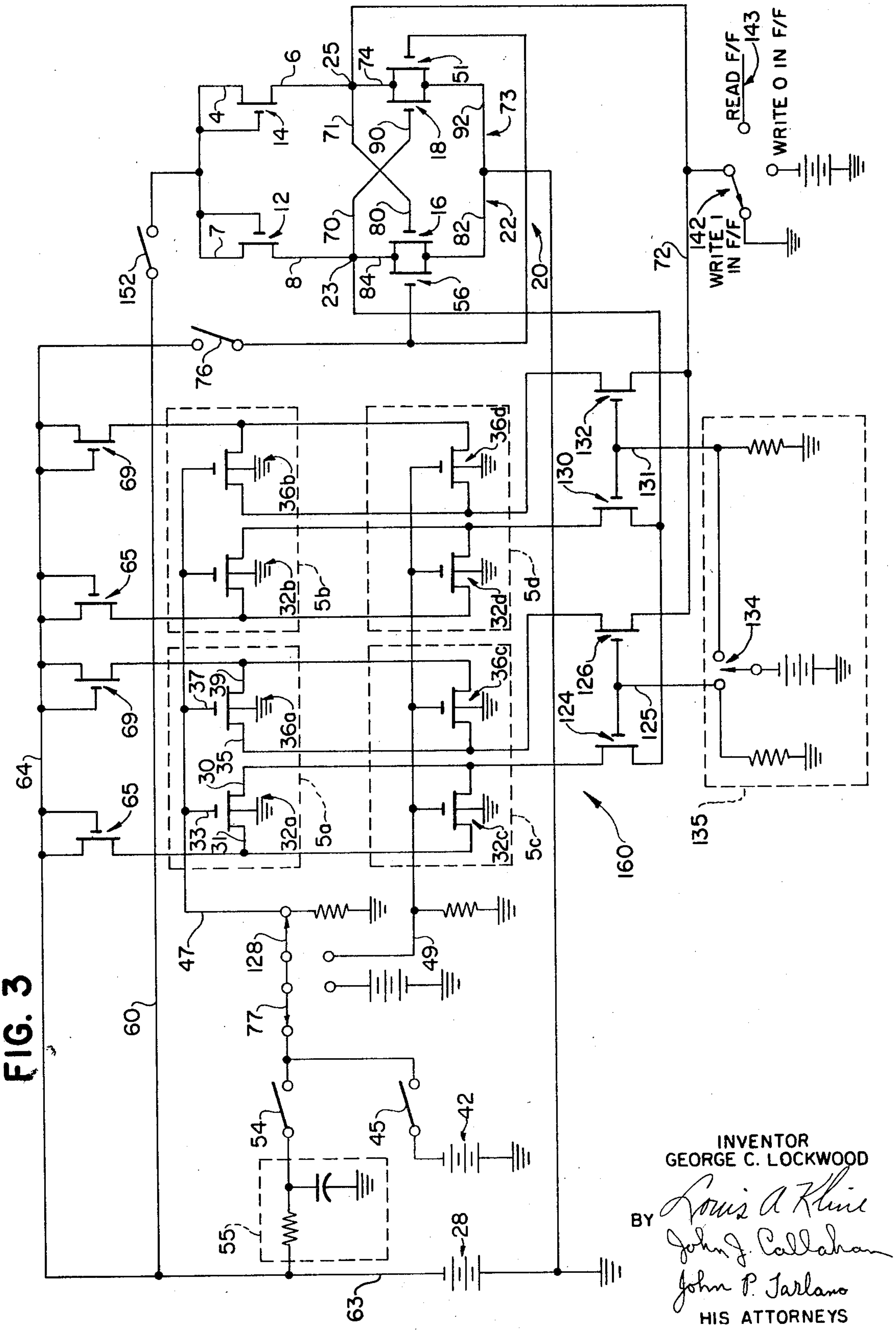
FIG. 3 is a schematic diagram of an array of nonvolatile memory cells of the present invention.

As shown in FIG. 3, a matrix 160 of nonvolatile memory cells 5*a*, 5*b*, 5*c*, and 5*d* is shown. The nonvolatile memory cells 5*a*, 5*b*, 5*c*, and 5*d* have their gate electrodes 33 and 37 connected to the variable gate voltage circuit 55 by means of the memory cell selection switches 128, 134, 77, and 54. A selected column of source electrodes 30 and 35 are connected to the flip-flop circuit 20 through column selection MOS transistors 124 and 126 or 130 and 132 to the switch 134 via the lines 125 and 131, to read or write any memory cell in the matrix 160. The drain electrodes 31 and 39 of the nonvolatile memory cells 5*a*, 5*b*, 5*c*, and 5*d* are connected to the load transistors 65 and 69, which are connected to a −24-volt battery 28 via the line 64. The column select transistors 124, 126, 130, and 132 are connected to the flip-flop circuit 20. The flip-flop circuit 20 is used to read information out of any nonvolatile memory cell of the matrix 160 of FIG. 3. It is also used to write new information in any nonvolatile memory cell in the matrix 160.

The gate electrodes of the column select transistors 124, 126, and 130, 132 are connected to the column selection circuit 135. The column select circuit 135 aids in selecting any nonvolatile memory cells in the matrix 160. The variable gate voltage row select switch 128 also aids in selecting any cells in the matrix 160. Thus any nonvolatile memory cell in the memory matrix 160 of FIG. 3 may be written or read by the column and row selection means of FIG. 3.

The array of nonvolatile memory cells of FIG. 3 forms a nonvolatile memory matrix 160. The electrically alterable read-only memory matrix 160 of FIG. 3 can store four binary bits of information nonvolatilly therein. One binary bit of information can be stored in each nonvolatile memory cell. The information in any selected nonvolatile memory cell 5 of FIG. 3 is read out in the same manner as disclosed for the readout of information from the cell 5 of FIG. 1. The writing, reading, and erasing of a selected memory cell of the memory matrix 160 of FIG. 3 is carried out as explained in the timing diagram of FIG. 2. The matrix 160 of FIG. 3 may be used as a random access nonvolatile electrically alterable read-only memory matrix. Any one of the nonvolatile memory cells in the nonvolatile memory matrix 160 may be individually read, or rewritten to change a binary bit therein. As shown in FIG. 3, a read-write switch 142 is used to read information out of any selected nonvolatile memory cell at the matrix 160 through the flip-flop circuit 20, or to read new information into any selected nonvolatile memory cell 5 of the matrix 160 through the flip-flop circuit 20.

In order to write a zero bit into a selected nonvolatile memory cell of he matrix 160 of FIG. 3, the flip-flop 20 is first set to a zero state. This is accomplished by putting a minus 24 volts on the terminal 25 with the switch 142 via the line 72. The switch 152 is then closed to set the flip-flop circuit 20 to a zero state. The switch 142 then may be placed in the read position. A minus 24 volts on the terminal 25 and a zero potential in the terminal 23 mean that the flip-flop circuit 20 is in a zero bit state. The switch 152 remains closed to apply the negative 24 volts on the line 60 to the flip-flop 20.

Thereafter, the left column of nonvolatile memory cells of the matrix 160 is selected by turning the switch 134 to the left. A minus 30 volts is applied through the switches 77 and 128 by closing the switch 45 to the line 47. The nonvolatile memory cell 5*a* of the matrix 160 is placed in a zero bit state by applying a negative 30 volts from the battery 42 through the switch 45.

Conversely, a "1" bit could have been written into the memory cell 5*a* by first placing the flip-flop circuit 20 in a "1" binary bit state. The terminal 25 would be held at ground potential with the switch 142, rather than at minus 24 volts. The flip-flop circuit 20 would then be set to a "1" state by closing the switch 152. The nonvolatile memory cell 5*a* would then be set to a "1" state by closing the switch 45.

The flip-flop circuit 20 is cleared by opening the switch 152 and momentarily closing it.

A column of memory cells is first selected by the switch 134 to read out a selected memory cell in the matrix 160. The memory cell 5*d* has previously been set to a "1" binary state. The right-hand column of the matrix 160 of FIG. 3 is selected by turning the switch 134 to the right, intending the memory cell 5*d* to be read. The switch 128 of FIG. 3 is switched to the line 49. The switch 54 is closed, with the switch 45 open, to place an increasingly negative voltage on the gate electrodes of the cell 5*d*. The flip-flop 20, which was cleared, is set to a "1" binary state by the memory cell 5*d*. The flip-flop circuit 20 is further set to a "1" binary state by now closing the switch 152. The switch 142 is in the read position. The ground potential on the line 72 indicates that the flip-flop circuit 20 is in the "1" binary state and therefore that the memory cell 5*d* is in the "1" binary state.

What is claimed is:

1. A nonvolatile memory cell circuit for the reading of a binary bit of information therein, comprising:

a. a first nonvolatile variable threshold field effect transistor having a source and a drain electrode, and a gate electrode insulated therefrom by a chargeable insulator layer for nonvolatilely storing a first electrical charge therein;

b. a second nonvolatile variable threshold field effect transistor having a source and a drain electrode, and a gate electrode insulated therefrom by a chargeable insulator layer in coupled to the first nonvolatile variable threshold field effect transistor for nonvolatilely storing a second electrical charge therein, the amount of the second electrical charge being greater or less than the amount of the first electrical charge to nonvolatilely store a one or zero binary bit of information respectively in the nonvolatile memory cell; and c. a flip-flop circuit means having two terminals, one terminal of which is connected to the source electrode of the first nonvolatile variable threshold field effect transistor and the other terminal of which is connected to the source electrode of the second nonvolatile variable threshold field effect transistor storage means for sensing the relative time of conduction of one nonvolatile variable threshold field effect transistor to the other nonvolatile variable threshold field effect transistor under the application of a common changing gate to source read voltage thereto to determine whether a binary one or zero bit of information respectively is stored in the nonvolatile memory cell circuit.

2. A nonvolatile memory cell circuit for the reading of a binary bit of information therein, comprising:

a. a first nonvolatile variable threshold MNOS field effect transistor having a source and a drain electrode, and a gate electrode insulated therefrom by a silicon nitride and a silicon oxide insulator layer for nonvolatilely storing a first electrical charge at the silicon nitride-silicon oxide layer interface therein;

b. a second nonvolatile variable threshold MNOS field effect transistor storage means in coupled the first nonvolatile variable threshold MNOS field effect transistor having a source and a drain electrode, and a gate electrode insulated therefrom by a silicon nitride and a silicon oxide insulator layer for nonvolatilely storing an electrical charge at the silicon nitride-silicon oxide layer interface therein, the amount of the electrical charge being greater or less than the amount of the first electrical charge to nonvolatilely store a one or zero binary bit of information respectively in the nonvolatile memory cell; and c. a flip-flop circuit means having two terminals, one terminal at which is connected to the source electrode of the first nonvolatile variable threshold MNOS field effect transistor and the other terminal of which is connected to the source electrode of the second nonvolatile variable threshold MNOS field effect transistor storage means for sensing the relative time of conduction of one nonvolatile variable threshold MNOS field effect transistor to the other nonvolatile variable threshold field MNOS effect transistor under the application of a common changing gate to source read voltage thereto to determine whether a binary one or zero bit of information respectively is stored in the nonvolatile memory cell circuit.

3. A nonvolatile memory cell circuit for the writing of a binary bit of information therein, comprising:

a. a first nonvo latile variable threshold field effect transistor having a source and a drain electrode, and a gate electrode insulated therefrom by a chargeable insulator layer for nonvolatilely storing a first electrical charge therein;

b. a second nonvolatile variable threshold field effect transistor having a source and a drain electrode, and a gate electrode insulated therefrom by a chargeable insulator layer in coupled to the first nonvolatile variable threshold field effect transistor for nonvolatilely storing an electrical charge therein, the amount of the electrical charge being greater or less than the amount of the first electrical charge;

c. a flip-flop circuit means having two terminals, each terminal of which is connected to a source electrode of the first and second nonvolatile variable threshold field effect transistor for applying a different voltage on each of said source electrodes to make the amount of the second electrical charge greater or less relative to the amount of the first electrical charge by applying a large constant gate voltage to said transistors to nonvolatilely store a binary one or zero bit of information respectively in the nonvolatile memory cell circuit due to the ability of one nonvolatile variable threshold field effect transistor to conduct before the other under the application of a common small changing gate to source read voltage thereto; and d. a gate write voltage means connected to said gate electrodes for applying a large constant gate voltage between the gate electrodes of the two nonvolatile variable threshold field effect transistors and said flip-flop circuit means.

4. A nonvolatile memory cell circuit for the writing of a binary bit of information therein, comprising:

a. a first nonvolatile variable threshold MNOS field effect transistor having a source and a drain electrode, and a gate electrode insulated therefrom by a silicon nitride and a silicon oxide insulator layer for nonvolatilely storing a first electrical charge at the silicon nitride-silicon oxide interface therein;

b. a second nonvolatile variable threshold MNOS field effect transistor having a source and a drain electrode, and a gate electrode insulated therefrom by chargeable silicon nitride and silicon oxide insulator layers in coupled to the first nonvolatile variable threshold MNOS field effect transistor for nonvolatilely storing a second electrical charge at the silicon nitride-silicon oxide interface therein, the amount of the second electrical charge being greater or less than the amount of the first electrical charge;

c. a flip-flop circuit means having two terminals, each terminal of which is connected to a source electrode of the first and second nonvolatile variable threshold MNOS field effect transistor for applying a different voltage on each of said source electrodes to make the amount of the second electrical charge greater or less relative to the amount of the first electrical charge by applying a large constant gate v oltage to said transistors to nonvolatilely store a binary one or zero bit of information respectively in the nonvolatile memory cell circuit due to the ability of one nonvolatile variable threshold MNOS transistor to conduct before the other under the application of a common small changing gate to source read voltage thereto; and d. a gate write voltage means connected to said gate electrodes for applying a large constant gate voltage between the gate electrodes of the two nonvolatile variable threshold field effect transistors and said flip-flop circuit means.

5. A nonvolatile memory cell circuit for the writing and reading of a binary bit of information therein, comprising:

a. a first nonvolatile variable threshold field effect transistor having a source and a drain electrode, and a gate electrode insulated therefrom by a chargeable insulator layer for nonvolatilely storing a first electrical charge therein;

b. a second nonvolatile variable threshold field effect transistor having a source and a drain electrode, and a gate electrode insulated therefrom by a chargeable insulator layer in coupled to the first nonvolatile variable threshold field effect transistor for nonvolatilely storing a second electrical charge therein,; and c. a flip-flop circuit means having two terminals, each terminal of which is connected to a source electrode of the first and second nonvolatile variable threshold field effect transistor for applying a different voltage on each of said source electrodes to make the amount of the second electrical charge greater or less relative to the amount of the first electrical charge by applying a large constant gate voltage to said transistors to nonvolatilely store a binary one or zero bit of information respectively in the nonvolatile memory cell due to the ability of one nonvolatile variable threshold field effect transistor to conduct before the other under the application of a common changing gate to source read voltage thereto and for sensing the relative time of turning on of one nonvolatile variable threshold field effect transistor to the other nonvolatile variable threshold field effect transistor under the application of a common small changing gate to source read voltage thereto to determine whether a binary one or zero bit of information respectively is stored in the nonvolatile memory cell circuit;

d. a gate read voltage means connected to each of said gate electrodes for applying a small changing gate voltage between the gate electrodes of the two nonvolatile variable threshold field effect transistors and said flip-flop circuit means; and e. a gate write voltage means connected to each of said gate electrodes for applying a large constant gate voltage between the gate electrodes of the two nonvolatile variable threshold MNOS field effect transistors and said flip-flop circuit means.

6. A nonvolatile memory cell circuit for the writing and reading of a binary bit of information therein, comprising:

a. a first nonvolatile variable threshold insulated gate MNOS field effect transistor having a source and a drain electrode, and a gate electrode insulated therefrom by a silicon nitride and a silicon oxide insulator layer for nonvolatilely storing a first amount of electrical charge at the silicon nitride-silicon oxide interface therein;

b. a second nonvolatile variable threshold MNOS insulated gate field effect transistor having a source and drain electrode, and a gate electrode insulated therefrom by a chargeable silicon nitride-silicon oxide insulator layer in coupled to the first nonvolatile variable threshold MNOS field effect transistor for nonvolatilely storing another amount of electrical charge at the silicon nitride-silicon oxide interface therein; and c. a flip-flop circuit means having two terminals, each terminal of which is connected to a source electrode of the first and second nonvolatile variable threshold MNOS field effect transistor for applying a different voltage on each of said source electrodes to make the amount of the second electrical charge greater or less relative to the amount of the first electrical charge by applying a large constant gate voltage to said transistors to nonvolatilely store a binary one or zero bit of information respectively in the nonvolatile memory cell due to the ability of one nonvolatile variable threshold MNOS field effect transistor to conduct before the other under the application of a common changing gate to source read voltage thereto and for sensing the relative time of conduction of one nonvolatile variable threshold MNOS field effect transistor to the other nonvolatile variable threshold field MNOS effect transistor under the application of a common changing gate to source read voltage thereto to determine whether a binary one or zero bit of information respectively is stored in the nonvolatile memory cell circuit;

d. a gate read voltage means connected to each of said gate electrodes for applying a small changing gate voltage between the gate electrodes of the two nonvolatile variable threshold MNOS field effect transistors and said flip-flop circuit means; and e. a gate write voltage means connected to each of said gate electrodes for applying a large constant gate voltage between the gate electrodes of the two nonvolatile variable threshold MNOS field effect transistors and said flip-flop circuit means.

7. A nonvolatile memory cell circuit for the reading of a binary bit of information therein, comprising:

a. a first nonvolatile variable threshold PNP-MNOS transistor having a source, a drain, and a gate electrode, a first negative charge being stored at a silicon nitride-silicon oxide insulator layer interface therein to decrease its threshold voltage;

b. a second nonvolatile variable threshold PNP-MNOS transistor having a source, a drain, and a gate electrode, greater or less negative charge than said first negative charge being stored at a silicon nitride-silicon oxide insulator layer interface therein to affect its threshold voltage, the gate electrodes of the two MNOS transistors being connected together to form an MNOS transistor pair; and c. a flip-flop circuit means having two terminals, each terminal of which is connected to a source electrode of said MNOS transistor pair for sensing the passage of a source to drain current through one nonvolatile PNP-MNOS transistor before the passage of a source to drain current through the other nonvolatile PNP-MNOS transistor under a negatively increasing read voltage to read the binary state of the MNOS transistor pair;

d. a gate read voltage means connected to each of said gate electrodes for applying a small negatively increasing gate voltage between the gate electrodes of the two nonvolatile variable threshold MNOS field effect transistors and said flip-flop circuit means.

8. A nonvolatile memory cell circuit for the reading and writing of a binary bit of information therein, comprising:

a. a first nonvolatile variable threshold PNP-MNOS transistor having a source electrode, a drain electrode, and a gate electrode, a first negative charge being stored at a silicon nitride-silicon oxide insulator layer interface therein to decrease its threshold voltage;

b. a second nonvolatile variable threshold PNP-MNOS transistor having a source electrode, a drain electrode, and a gate electrode, greater or less negative charge than said first negative charge being stored at a silicon nitride-silicon oxide insulator layer interface therein to affect its threshold voltage, the gate electrodes of the two MNOS transistors being connected together to form an MNOS transistor pair;

c. a flip-flop circuit means having two terminals, each terminal of which is connected to a source electrode of said MNOS transistor pair for sensing the passage of a source to drain current through one nonvolatile PNP-MNOS transistor before the passage of a source to drain current through the other nonvolatile PNP-MNOS transistor under a negatively increasing read voltage to read the binary state of the MNOS transistor pair and for applying a different voltage on each of said source electrodes to produce a relative amount of negative charge in the MNOS transistor pair to set the binary state of the MNOS transistor pair by applying a large constant negative gate voltage to said transistors;

d. a gate read voltage means connected to each of said gate electrodes for applying a small negatively increasing gate voltage between the gate electrodes of the two nonvolatile variable threshold PNP-MNOS field effect transistors and said flip-flop circuit means; and e. a gate write voltage means connected to each of said gate electrodes for applying a large constant negative gate voltage between the gate electrodes of the two nonvolatile variable threshold PNP-MNOS field effect transistors and said flip-flop circuit means.

9. A nonvolatile memory matrix circuit for the reading of binary bits of information therein, comprising:

a. an array of nonvolatile variable threshold transistor pairs, the gate electrodes of the two transistors of each transistor pair being connected together, less negative charge being stored in one transistor than in the other transistor of each transistor pair, so that, under the action of a changing gate to source voltage, a source to drain current passes through one nonvolatile variable threshold transistor before it passes through the other nonvolatile variable threshold transistor of each transistor pair, so as to indicate the binary state of each transistor pair in the nonvolatile memory matrix; and b. a flip-flop circuit means having two terminals, each terminal of which is connected to a source electrode of a selected transistor pair in said array of transistor pairs for applying unequal terminal voltages to the source electrodes of the selected transistor pair to allow a common gate voltage to write a binary bit of information into said selected transistor pair, and for sensing passage of current through one nonvolatile variable threshold transistor before the other nonvolatile variable threshold transistor to read the binary state of the selected transistor pair.

10. A nonvolatile memory matrix for the writing of binary bits of information therein, comprising:

a. an array of nonvolatile variable threshold MNOS transistor pairs, the gate electrodes of the two transistors of each transistor pair being connected together, less negative charge being stored in one MNOS transistor than in the other MNOS transistor of each transistor pair, so that, under the action of a changing gate to source voltage, a source to drain current passes through one nonvolatile variable threshold MNOS transistor before it passes through the other nonvolatile variable threshold MNOS transistor of each transistor pair, so as to indicate the binary state of each transistor pair in the nonvolatile memory matrix; and b. a flip-flop circuit means having two terminals, each terminal of which is connected to a source electrode of a selected MNOS transistor pair in said array of MNOS transistor pairs for producing the relative amount of negative charge in the two nonvolatile variable threshold MNOS transistors in the selected MNOS transistor pair to set the binary state of the selected transistor pair when a large constant gate voltage is applied to said selected MNOS transistor pair.

11. A nonvolatile memory matrix circuit for the reading and writing of binary bits of information therein, comprising:

a. an array of nonvolatile variable threshold transistor pairs, the gate electrodes of the two transistors of each transistor pair being connected together, less negative charge being stored in one transistor than in the other transistor of each transistor pair, so that, under the action of a changing gate to source voltage, a source to drain current passes through one nonvolatile variable threshold transistor before it passes through the other nonvolatile variable threshold transistor of each transistor pair, so as to indicate the binary state of each transistor pair in the nonvolatile memory matrix; and b. a flip-flop circuit means having two terminals, each terminal of which is connected to a source electrode of a selected transistor pair in said array of transistor pairs for sensing the passage of current through one nonvolatile variable threshold transistor before the other nonvolatile variable threshold transistor to read the binary state of the selected transistor pair and for applying unequal terminal voltages to the source electrodes of the selected transistor pair to produce a relative amount of negative charge in the two nonvolatile variable threshold transistors in a selected transistor pair to set the binary state of the selected transistor pair when a large constant gate voltage is applied to said transistor pair;

c. a gate read voltage means connected to each of said gate electrodes for applying a small changing gate voltage between the gate electrodes of the selected nonvolatile variable threshold transistor pair and said flip-flop circuit means; and d. a gate write voltage means connectable to the two gate electrodes of the selected nonvolatile variable threshold transistor pair for applying a large constant gate voltage between the selected two nonvolatile variable threshold field effect transistors and said flip-flop circuit means.

* * * * *

UNITED STATES PATENT OFFICE
CERTIFICATE OF CORRECTION

Patent No. 3,651,492 Dated March 21, 1972

Inventor(s) George C. Lockwood

It is certified that error appears in the above-identified patent and that said Letters Patent are hereby corrected as shown below:

Column 7, line 28, delete "in" and insert -- to -- after "coupled".
Column 7, line 61, delete "in".
Column 8, line 21, delete "in".
Column 8, line 57, delete "in".
Column 9, line 27, delete "in".

Signed and sealed this 1st day of August 1972.

(SEAL)
Attest:

EDWARD M.FLETCHER,JR.
Attesting Officer

ROBERT GOTTSCHALK
Commissioner of Patents